United States Patent [19]

Ogawa et al.

[11] 4,215,021

[45] Jul. 29, 1980

[54] COATING RUBBER COMPOSITION FOR TIRE CORDS

[75] Inventors: Masaki Ogawa, Sayama; Tamio Araki, Masashino; Shinji Yamamoto, Ichihara, all of Japan

[73] Assignees: Bridgestone Tire Company Limited, Tokyo; Ube Industries, Ltd., Ube, both of Japan

[21] Appl. No.: 27,415

[22] Filed: Apr. 5, 1979

[30] Foreign Application Priority Data

Apr. 6, 1978 [JP] Japan .................................. 53-39679

[51] Int. Cl.$^2$ ............................ C08K 5/00; C09L 7/00
[52] U.S. Cl. ..................................... 260/5; 260/42.21; 260/42.47; 260/42.54; 260/42.56; 264/171; 264/349; 525/536
[58] Field of Search ...................... 260/5, 42.21, 42.47, 260/42.54, 42.56; 525/536; 264/349, 171

[56] References Cited

U.S. PATENT DOCUMENTS

| | | | |
|---|---|---|---|
| 3,597,498 | 8/1971 | Christensen | 264/171 |
| 3,658,981 | 4/1972 | Fleming et al. | 264/349 |
| 3,827,991 | 8/1974 | Ando et al. | 260/5 |

*Primary Examiner*—J. Ziegler
*Attorney, Agent, or Firm*—Sughrue, Rothwell, Mion, Zinn and Macpeak

[57] ABSTRACT

A coating rubber composition for tire cords is disclosed. This composition is an unvulcanized rubber composition comprising 3–40 parts by weight of short fibers of syndiotactic-1,2-polybutadiene having a maximum diameter of not more than 10$\mu$ and an average diameter of less than 1$\mu$ and 30–120 parts by weight of carbon black, on a basis of 100 parts by weight of a rubber, and has a swelling value of not more than 140% in the extrusion at 100° C.

4 Claims, No Drawings

COATING RUBBER COMPOSITION FOR TIRE CORDS

BACKGROUND OF THE INVENTION (1) Field of the Invention

This invention relates to a novel coating rubber composition usable for tire cords wherein swelling in extrusion is reduced and dimensional stability and modulus of elasticity are improved by compounding short fibers of syndiotactic (hereinafter abbreviated as syn)-1,2-polybutadiene into a rubber.

(2) Description of the Prior Art

Recently, savings of resources and energy become a significant subject in industries. Particularly, saving of fuel consumption in vehicles by weight-saving of tire and reduction of tire rolling resistance is significantly interested in tire industry. For this end, there has hitherto been studied a method wherein the weight-saving of tire is carried out by increasing strengths of materials to be used in tread and bead portions of the tire, but such a weight-saving has already reached the limit.

Now, attemps have been made to reduce a weight of a coating rubber composition for cords in a carcass and a breaker. However, it is very difficult to make a thickness of a rubber coating thin and uniform. For instance, when the coating rubber composition is extruded through an orifice of an extruder, an extrudate having a shape larger than that of the orifice is obtained due to an elasticity inherent to an unvulcanized rubber. This phenomenon is usually called as a swelling. If the swelling is large, the thickness of the rubber coating covering the cord becomes thicker locally and hence it is difficult to uniformly coat the cord with the coating rubber composition. Therefore, it is usually performed that the thickness of the rubber coating is slightly thickened in advance. Thus, it is an essential feature that the swelling of the rubber coating is small in order to make the thickness of the coating uniform and thin.

Moreover, even if it is possible to uniformly and thinly coat the cords with the coating rubber composition, when a carcass or breaker is made from a plurality of such rubberized cord layers, a distance between the cords in the adjacent upper and lower layers becomes small and hence an interlaminar shearing stress applied to the rubber between the cords becomes large and consequently it is apt to cause a fracture of rubber. Therefore, it is necessary to use a rubber capable of enduring the interlaminar shearing stress.

Up to now, however, there is not yet realized a coating rubber composition having a small degree of swelling, a high strength and an excellent durability.

SUMMARY OF THE INVENTION

The inventors have made various studies with respect to the development of coating rubber compositions eliminating the above mentioned drawbacks of the prior art and have found out that an unvulcanized coating rubber composition obtained by compounding specified amounts of syn-1,2-polybutadiene short fibers and carbon black into a rubber has a small degree of swelling, a high strength and a excellent durability, and the invention has been accomplished.

According to the invention, there is provided a coating rubber composition usable for tire cords, comprising an unvulcanized rubber composition comprising 3-40 parts by weight of short fibers of syndiotactic-1,2-polybutadiene having a maximum diameter of not more than $10\mu$ and an average diameter of less than $1\mu$ and 30-120 parts by weight of carbon black, on a basis of 100 parts by weight of a rubber selected from natural rubbers, synthetic rubbers and blends thereof in an optional blending ratio; said composition having a swelling value of not more than 140% in the extrusion at 100° C.

DETAILED DESCRIPTION OF THE INVENTION

As the rubber contained in the coating rubber composition for tire cords according to the invention, use may be made of natural rubbers, synthetic rubbers and blends thereof in an optional blending ratio. As the synthetic rubber, there are preferably used diene type synthetic rubbers such as polybutadiene rubber, styrene-butadiene copolymer rubber, ethylene-propylene-diene terpolymer rubber, polyisoprene rubber, butyl rubber and the like.

According to the invention, short fibers of syn-1,2-polybutadiene to be compounded with the rubber have a maximum diameter of not more than $10\mu$ and an average diameter of less than $1\mu$. For example, the syn-1,2-polybutadiene short fibers are produced as follows: that is, syn-1,2-polybutadiene particles having a particle size of $10-700\mu$ are kneaded with unvulcanized rubber at a temperature below 190° C. and then the resulting mixture is extruded through a circular die having an inner diameter of 1-5 mm and a ratio of length to inner diameter of 1-20 at a temperture of at least 5° C. higher than the melting point of syn-1,2-polybutadiene. Next, the resulting extrudate is cooled to room temperature and stretched by means of rolls at a roll temperature of 50°-100° C., whereby short fibers of oriented syn-1,2-polybutadiene can be obtained as a masterbatch wherein these fibers are dispersed in rubber. If it is intended to provide only the short fibers, the masterbatch may be treated with a solvent capable of dissolving only rubber, such as benzene or toluene. Moreover, a softener such as process oil, stearic acid, liquid rubber and the like, a reinforcer such as carbon black or a pigment may be added during the kneading.

Since the short fibers of syn-1,2-polybutadiene have a maximum diameter of not more than $10\mu$ and an average diameter of less than $1\mu$, they firmly adhere to rubber and have an effect of preventing the occurrence of rubber creeping. On the contrary, when the maximum diameter and average diameter of the short fibers are beyond the above defined values, the creep of rubber becomes larger and hence the flex resistance is deteriorated as mentioned below or in case of a belted tire, for example, the large creep of the coating rubber enlarges the diameter of the tire to a certain extent and consequently the durability lowers. Therefore, the maximum diameter and average diameter of the short fibers should be limited to the above defined values.

According to the invention, the syn-1,2-polybutadiene short fibers are preferable to have a 1,2-structure unit content of not less than 80%. When the 1,2-structure unit content is less than 80%, the molecular regularity is low, so that the strength of the short fibers lowers and consequently the short fibers are cut at the stretching step. Thus, the short fibers having the 1,2-structure unit content of less than 80% can not develop a sufficient reinforcing effect.

Further, the syn-1,2-polybutadiene short fibers are preferable to have a melting point of not less than 190°

C. When the melting point is less than 190° C., the temperature dependence of the short fibers becomes large and hence the vulcanizate compounded with such short fibers has a large temperature dependence. Moreover, the syn-1,2-polytutadiene short fibers are preferable to have a length of not more than 10 mm, because when the length is more than 10 mm, the workability of the resulting rubber composition is deteriorated too far.

According to the invention, an amount of the syn-1,2-polybutadiene short fibers is 3–40 parts by weight, preferably 5–20 parts by weight based on 100 parts by weight of the rubber. When the amount of the short fibers is smaller than 3 parts by weight, the addition effect is less, while when the amount exceeds 40 parts by weight, the elasticity inherent to the rubber is lost.

In the coating rubber composition according to the invention, carbon black is added in an amount of 30–120 parts by weight based on 100 parts by weight of the rubber. When the amount of carbon black is smaller than 30 parts by weight, the reinforcing effect is not satisfactorily obtained, while when the amount exceeds 120 parts by weight, the elasticity inherent to the rubber lowers and further the workability is considerably deteriorated.

Moreover, the coating rubber composition for tire cords according to the invention has a swelling value of not more than 140%. When the swelling value exceeds 140%, it is difficult to uniformly coat the cord with the coating rubber composition. The term "swelling value" used herein means a percentage of a numerical value obtained by dividing a diameter of an extrudate by a diameter of an orifice when extruding the coating rubber composition through the circular orifice having a diameter of 2 mm and a length of 4 mm at a straining rate of 200 sec$^{-1}$.

The tire cords to be coated with the coating rubber composition according to the invention include cords composed of natural or synthetic organic fiber, glass cords, metallic cords and the like.

Hitherto, there have known rubber compositions reinforced with short fibers made of nylon, polyester, glass or the like. However, such short fiber reinforced rubber compositions are scarcely used as a coating rubber composition for tire cords, because they have a drawback that the adhesion of short fibers to rubber is insufficient and hence a fatally large creep of rubber is caused and further the life at fracture of rubber becomes very short when subjecting to repeated extension. On the contrary, the novel coating rubber composition according to the invention has such a merit that the swelling value of the unvulcanized rubber is reduced by compounding the syn-1,2-polybutadiene short fibers into the rubber, whereby the thickness of the rubber coating can be thinned uniformly. Further, the syn-1,2-polybutadiene short fibers firmly adhere to the rubber after the vulcanization, so that the durability of the vulcanizate is largely improved without causing the creep of rubber. Therefore, the coating rubber composition according to the invention is very useful for coating tire cords.

The invention will be described in greater detail with reference to the following examples and comparative examples.

EXAMPLES 1–3 and Comparative examples 1–2

Various rubber compositions having a compounding recipe as shown in the following Table 1 were prepared and the swelling value, flex resistance and drum durability were measured to obtain a result as shown in Table 1.

The flex resistance was estimated by a flexing number of the rubber composition after the vulcanization up to occurrence of crack using a de Mattia machine (300 cycles/minute) and indicated as a flex resistance index according to the following equation:

$$\text{Flex resistance index} = \frac{\text{Flexing number of each example}}{\text{Flexing number of Example 1}} \times 100$$

That is, it is apparent that the higher the value of the flex resistance index, the better the flex resistance.

The drum durability was measured as follows: that is, the radial tire for bus and truck having a tire size of 1000-20 and a belt composed of three rubberized steel cord layers was manufactured by using each of the rubber compositions shown in Table 1 as a coating for steel cord having a thickness of 5 mm and then run on an iron drum at a speed of 80 km/h under conditions that an internal pressure is 7.5 kg/cm$^2$ and a load is 100% of commonly design load until the rubber between the cord layers is fractured. The running distance of the tire up to the occurrence of rubber fracture is indicated as the drum durability.

Moreover, the average diameter of the syn-1,2-polybutadiene short fibers was measured as follows: that is, a mixture consisting of the rubber and syn-1,2-polybutadiene short fibers obtained by extruding a blend of the rubber and syn-1,2-polybutadiene particles through a circular die with a diameter of 2 mm and a length of 10 mm was imbued in n-hexane for 48 hours to dissolve the rubber. Thus obtained short fibers were dried at a freezing temperature and dyed with osmium oxide. Then, they were embedded into polymethylmethacrylate and cut in a direction perpendicular to the extrusion direction to form a very thin slice. The diameters of short fibers contained in the slice were measured by an electron microscope and then the average diameter was calculated according to the following equation:

$$\bar{r} = \frac{\Sigma ni \cdot ri}{\Sigma ni}$$

wherein $\bar{r}$ is an average diameter, ri is a diameter of short fiber, ni is a number of short fibers having a diameter of ri and $\Sigma ni$ is 300.

Table 1(a)

| Compounding recipe (parts by weight) | Example 1 | Example 2 | Example 3 | Comparative example 1 | Comparative example 2 |
|---|---|---|---|---|---|
| Natural rubber | 90 | 90 | 90 | 90 | 90 |
| Polyisoprene rubber | 10 | 10 | 10 | 10 | 10 |
| Carbon black N-330 | 60 | 60 | 60 | 60 | 60 |
| Spindle oil | 15 | 15 | 15 | 15 | 15 |
| Stearic acid | 3 | 3 | 3 | 3 | 3 |
| Zinc white | 4.5 | 4.5 | 4.5 | 4.5 | 4.5 |
| N-oxydiethylene-2-benzothiazylsulfenamide | 0.8 | 0.8 | 0.8 | 0.8 | 0.8 |
| Sulfur | 2.5 | 2.5 | 2.5 | 2.5 | 2.5 |
| Syn-1,2-polybutadiene short fiber No. 1 | 20 | | | | |
| Syn-1,2-polybutadiene short fiber No. 2 | | 20 | | | |
| Syn-1,2-polybutadiene | | | | | |

Table 2(a)

| Compounding recipe (parts by weight) | Comparative example 3 | Comparative example 4 | Example 4 | Example 5 | Example 6 | Example 7 | Comparative example 5 |
| --- | --- | --- | --- | --- | --- | --- | --- |
| Natural rubber | 95 | 95 | 95 | 95 | 95 | 95 | 95 |
| Polybutadiene rubber | 5 | 5 | 5 | 5 | 5 | 5 | 5 |
| Carbon black N-330 | 55 | 55 | 55 | 55 | 55 | 55 | 55 |
| Spindle oil | 10 | 10 | 10 | 10 | 10 | 10 | 10 |
| Stearic acid | 2 | 2 | 2 | 2 | 2 | 2 | 2 |
| 4,4'-thiobis(6-tert-butyl-3-methylphenol) | 1 | 1 | 1 | 1 | 1 | 1 | 1 |
| Zinc white | 4 | 4 | 4 | 4 | 4 | 4 | 4 |
| N-oxydiethylene-2-benzothiazyl-sulfenamide | 0.8 | 0.8 | 0.8 | 0.8 | 0.8 | 0.8 | 0.8 |
| Sulfur | 2 | 2 | 2 | 2 | 2 | 2 | 2 |
| Syn-1,2-polybutadiene short fiber No. 1 | — | 1 | 3 | 5 | 25 | 40 | 50 |

Table 2(b)

| Compounding recipe (parts by weight) | Comparative example 3 | Comparative example 4 | Example 4 | Example 5 | Example 6 | Example 7 | Comparative example 5 |
| --- | --- | --- | --- | --- | --- | --- | --- |
| Results | | | | | | | |
| Swelling value % | 185 | 154 | 139 | 125 | 118 | 115 | 110 |
| Flex resistance index | 121 | 125 | 112 | 113 | 101 | 83 | 58 |
| Coating state | bad | bad | good | excellent | excellent | excellent | excellent |
| Drum durability km | 22,300 | 25,600 | 50,000 completely run | 50,000 completely run | 50,000 completely run | 41,320 | 32,500 |

| Compounding recipe (parts by weight) | Example 1 | Example 2 | Example 3 | Comparative example 1 | Comparative example 2 |
| --- | --- | --- | --- | --- | --- |
| short fiber No. 3 | | | 20 | | |
| Syn-1,2-polybutadiene short fiber No. 4 | | | | 20 | |
| Syn-1,2-polybutadiene short fiber No. 5 | | | | | 20 |

Table (b)

| Compounding recipe (parts by weight) | Example 1 | Example 2 | Example 3 | Comparative example 1 | Comparative example 2 |
| --- | --- | --- | --- | --- | --- |
| Average diameter of short fiber μ | 0.2 | 0.5 | 0.8 | 1.5 | 10.0 |
| Maximum diameter of short fiber μ | 29 | 7.0 | 7.5 | 12 | 59 |
| Results | | | | | |
| Swelling value % | 121 | 123 | 122 | 124 | 130 |
| Flex resistance index | 100 | 98 | 96 | 88 | 87 |
| drum durability km | 50,000 completely run | 50,000 completely run | 50,000 completely run | 32,400 | 33,200 |

From the data of Table 1, it is apparent that the coating rubber composition containing the syn-1,2-polybutadiene short fibers according to the invention is substantially free from the creep and excellent in the flex resistance so that the durability is largely improved.

EXAMPLES 4–7 and Comparative examples 3–5

Various rubber compositions having a compounding recipe as shown in the following Table 2 were prepared and examined in the same manner as described in Example 1 to obtain a result as shown in Table 2. Moreover, there was observed a coating state (whether or not the coating rubber having a uniform thickness is obtained).

As apparent from the data of Table 2, the flex resistance is apt to deteriorate as the amount of the syn-1,2-polybutadiene short fibers increases, while as the amount of such short fiber decreases, the strength lowers and the durability degrades. Therefore, it can be seen that the object of the invention is first achieved when the amount of the short fibers is 3–40 parts by weight, preferably 5–20 parts by weight based on 100 parts by weight of the rubber.

In the coating rubber composition according to the invention, the coating workability is good and the durability is excellent, so that the thickness of the coating rubber can be thinned considerably. As a result, the coating rubber composition according to the invention is very useful for realizing the weight-saving of the tire.

What is claimed is:

1. A coating rubber composition for tire cords, obtained by an unvulcanized rubber composition comprising 3–40 parts by weight of short fibers of syndiotactic-1,2-polybutadiene having a maximum diameter of not more than 10μ and an average diameter of less than 1μ and 30–120 parts by weight of carbon black, on a basis of 100 parts by weight of a rubber selected from natural rubbers, synthetic rubbers and blends thereof in an optional blending ratio; said composition having a swelling value of not more than 140% in the extrusion at 100° C.

2. A coating rubber composition as claimed in claim 1, wherein each of said short fibers of syndiotactic-1,2-polybutadiene has a 1,2-structure unit content of not less than 80%.

3. A coating rubber composition as claimed in claim 1, wherein each of said short fibers of syndiotactic-1,2-polybutadiene has a melting point of not less than 190° C.

4. A coating rubber composition as claimed in claim 1, wherein the amount of said short fibers of syndiotactic-1,2-polybutadiene is 5–20 parts by weight.

* * * * *